United States Patent Office 3,469,704
Patented Sept. 30, 1969

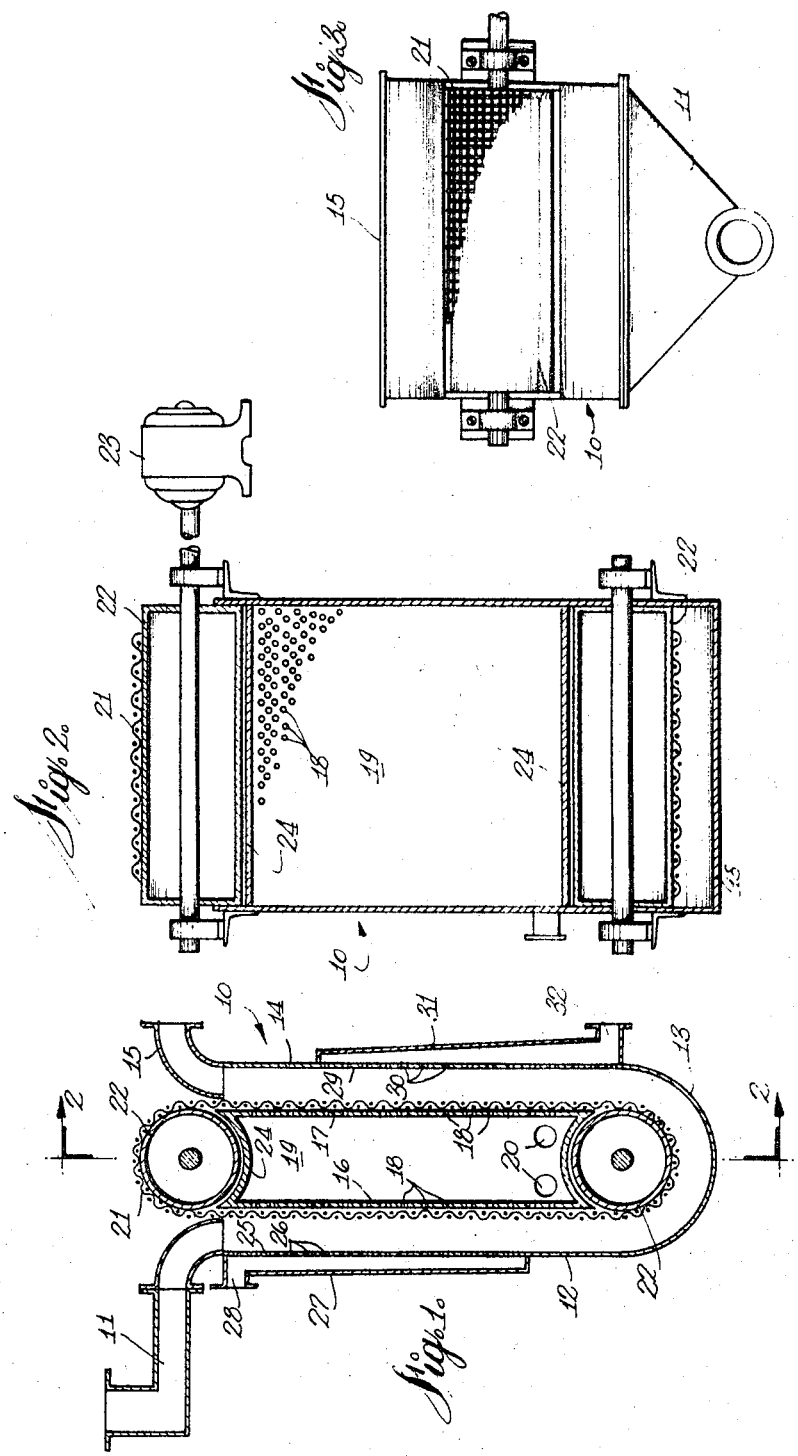

3,469,704
SLURRY WASHING APPARATUS
Ola Sepall, Quebec, Quebec, Canada, assignor to Anglo Paper Products, Limited, Quebec, Quebec, Canada
Filed Sept. 19, 1967, Ser. No. 669,364
Int. Cl. B01d 33/38, 33/04
U.S. Cl. 210—401
3 Claims

ABSTRACT OF THE DISCLOSURE

A slurry washing apparatus is disclosed which comprises an elongated vessel of rectangular cross-section. Slurry is fed into one end and the washed material discharged from the other end. At least one pair of opposed wall sections of the vessel are perforated and a travelling foraminous belt overlies a first one of such wall sections. Washing liquid is supplied to the vessel through the other wall section, and a filtrate collecting chamber is provided exteriorly of the first section.

BACKGROUND OF THE INVENTION

Field of the invention.—In many industries, including pulp and paper, there are numerous processes which require the separation of a liquid from a solid in slurry form. The purpose is generally the purification of the solid from contaminating materials in solution and frequently it is also important to recover the solution as completely as possible and with minimal dilution.

Description of the prior art.—Various types of equipment are available for this purpose. One of the most common is the continuous rotating drum washer which filters out the slurry on a porous surface of the drum with subsequent washing by liquid sprays applied to the surface. Another device is a batch diffuser which comprises a vessel having a perforated bottom floor. The slurry is fed into the vessel, allowed to drain, and wash liquid applied on the top to displace the liquor.

A more recent device comprises a cylindrical vessel in which the slurry moves axially. Wash liquid is applied along the axis and displaced outwardly. Perforated filtering sections in the cylinder walls serve to extract the displaced liquor.

SUMMARY OF THE INVENTION

The invention resides in a slurry washing apparatus comprising an elongated vessel of rectangular cross-section, said vessel having a slurry inlet at one end thereof, an outlet at the other end thereof, and a pair of opposed perforated walls intermediate said ends, an endless foraminous belt in said vessel overlying a first one of said perforated walls, means for applying travelling movement to said belt, means for feeding wash liquid into said vessel through the other of said perforated walls, and means forming a filtrate receiving chamber exteriorly of said first perforated wall.

The invention set forth has several advantages. The continuous drum washer is generally recognized as being of low efficiency. It is commonplace to have two or three drum washers operating in series so as to achieve the required efficiency by multiple washing treatments. The limitation arises with this equipment because washing times must necessarily be kept very brief. Much of the drum surface is used for filtering out the slurry since the feed must be at low concentration to permit forming a continuous filter cake on the drum. This problem does not exist with the present invention. Furthermore, the wash liquid on drum washers is applied by sprays which create problems in achieving uniform application and in avoiding disruption of the filter cake. Impinging sprays also create foam.

The conventional batch diffuser overcomes some of these drawbacks since wash liquid is applied by continuous flooding of the whole surface. It is evident that washing time can also be readily extended to any desired value because none of the area is required for thickening the slurry and mechanical size limitations are not limiting as with rotating drums. In short, the diffuser is quite efficient but, unfortunately, requires much operating labor and so operating costs are high. The present invention is suitable for continuous operation and so benefits from cost savings associated with such systems.

The cylindrical continuous diffuser has several advantages but is inherently limited in some respects. One is the difficulty of achieving uniform displacement of wash liquid in a radial pattern. This problem becomes greater as the size increases and experience indicates that high washing efficiencies have not been attained. Another problem resides in the long distance of the flow path of wash liquid through the slurry. This has the disadvantage of increasing the resistance to flow and thereby decreasing the filtration rate. As a first approximation, it can be considered that the filtration rate decreases proportionally as the wash path increases and consequently the volume of the washing zone and the size of the equipment will increase in the same ratio. It is consequently desirable to have the least possible slurry thickness so as to have the smallest possible equipment. The present invention is particularly advantageous in this respect.

BRIEF DESCRIPTION OF THE DRAWING

FIGURE 1 is a sectional side elevation of an apparatus in accordance with the invention, FIGURE 2 is a section on line 2—2 of FIGURE 1, and FIGURE 3 is a plan view.

DESCRIPTION OF THE PREFERRED EMBODIMENT

In the drawing, 10 is an elongated vessel of rectangular cross-section. As shown, the vessel is U-shaped and in longitudinal extent comprises an inlet section 11, a first straight vertical portion 12, a reverse bend or arcuate portion 13, a second straight vertical portion 14, and an outlet section 15.

The inner or confronting wall sections 16, 17 of portions 12, 14, respectively, are provided with a multiplicity of perforations 18. These wall sections 16, 17 also constitute side walls of a suction chamber 19 to which suction may be applied through openings 20.

An endless foraminous belt 21 is mounted for travel on rollers 22 the upper one of which is driven by any suitable means, such as motor 23. The main travelling sections of the belt overlie, in close proximity, the inner surfaces of wall sections 16, 17. As shown, the lower roller 22 with the belt thereon constitutes the inner wall surface of the arcuate portion of the vessel. Also, in the modification shown, the end walls 24 of the chamber 19 are curved to conform with the shape of the rollers 22.

Portion 12 of the vessel has an outer wall section 25 in opposed relation to section 16 and also provided with a multiplicity of perforations 26. A liquid jacket 27 extends over section 25 and is adapted to be supplied with wash liquid through inlet 28.

Portion 14 of the vessel has an outer wall section 29 in opposed relation to section 17 and is provided with a multiplicity of perforations 30. A liquid jacket 31 extends over section 29 and is adapted to be supplied with wash liquid through inlet 32.

The operation of the apparatus will be apparent from the foregoing description. Slurry, such as a paper making pulp is fed into the device through inlet section 11. Wash liquid is fed through perforated wall section 25 into vessel portion 12. Filtrate moving through the belt and perforated wall section 16 is collected and recovered in chamber 19. The filter cake is moved on the travelling wire and is subjected to a second washing treatment in vessel portion 14 by flow of wash liquid through perforated wall section 29 with movement of the filtrate through the belt and perforated wall section 17 into chamber 19.

I claim:

1. Slurry washing apparatus comprising walls forming an elongated vessel of rectangular cross-section, said vessel having a slurry inlet at one end thereof and an outlet at the other end thereof, one of said walls having a first perforated section therein, means forming a filtrate receiving chamber separately of said vessel, said first perforated section constituting a wall of said chamber for communication therethrough of said chamber with the interior of said vessel, means for applying suction to said chamber, an endless foraminous belt extending into said vessel and having a portion in adjoining overlying relation to said first perforated section, means for supporting and applying travelling movement to said belt, another of said walls having a second perforated section therein in opposed relation to said first section and said belt portion, and a jacket exteriorly of said vessel enclosing said second perforated section and having a feed inlet for wash liquid for circulation of said wash liquid through said jacket and said second perforated section into said vessel.

2. Slurry washing apparatus comprising walls forming an elongated vessel of rectangular cross-section, said vessel having a slurry inlet at one end thereof and an outlet at the other end thereof, one of said walls having a first series of perforated sections therein, means forming a filtrate receiving chamber separately of said vessel, said first series of perforated sections constituting a wall of said chamber for communication therethrough of said chamber with the interior of said vessel, another of said walls having a second series of perforated sections therein, each of said sections of said second series being in opposed relation to one of said sections of said first series, an endless foraminous belt extending into said vessel and having portions in adjoining overlying relation to said first series of perforated sections, means for supporting and applying travelling movement to said belt, and a jacket exteriorly of said vessel and enclosing each of said perforated sections of said second series, said jacket having a feed inlet for wash liquid for circulation of wash liquid through said jacket and perforated sections of said second series into said vessel.

3. Slurry washing apparatus comprising walls forming an elongated U-shaped vessel of rectangular cross-section having a slurry inlet at one end thereof, a first longitudinally extending portion adjacent said inlet, an arcuate portion, a second longitudinally extending portion, and an outlet at the other end of said vessel adjacent said second portion, one of said walls in each of said first and second vessel portions having a first perforated section, means forming a filtrate receiving chamber between said first and second vessel portions and constituted in part by said perforated sections for communication therethrough of said chamber with the interior of said vessel, an endless foraminous belt extending into said vessel and having portions in adjoining overlying relation to said first perforated sections, means for supporting and applying travelling movement to said belt, another of said walls in each of said first and second vessel portions having a second perforated section in opposed relation to said first perforated section therein, jacket means exteriorly of said vessel and enclosing said second perforated sections, said jacket having means for receiving wash liquid for circulation of said wash liquid through said second perforated sections into said vessel.

References Cited

UNITED STATES PATENTS 2,036,168   3/1936   Engert et al. _____ 162—323 X

REUBEN FRIEDMAN, Primary Examiner

T. A. GRANGER, Assistant Examiner